(12) United States Patent
Kolbe et al.

(10) Patent No.: US 7,665,596 B2
(45) Date of Patent: Feb. 23, 2010

(54) APPARATUS FOR THE OUTFLOW OF PRESSED ITEMS FROM A ROTARY PRESS

(75) Inventors: Sven Kolbe, Büchen (DE); Ulrich Arndt, Lauenburg (DE)

(73) Assignee: Fette GmbH, Schwarzenbek (DE)

( * ) Notice: Subject to any disclaimer, the term of this patent is extended or adjusted under 35 U.S.C. 154(b) by 0 days.

(21) Appl. No.: 12/047,800

(22) Filed: Mar. 13, 2008

(65) Prior Publication Data
US 2008/0237097 A1 Oct. 2, 2008

(30) Foreign Application Priority Data
Mar. 31, 2007 (DE) .................. 10 2007 015 672

(51) Int. Cl.
*B65G 47/10* (2006.01)
(52) U.S. Cl. .................. 198/367; 198/369.2; 193/31 A
(58) Field of Classification Search ............ 193/13, 193/14, 31 R, 31 A; 198/367, 368, 359, 355, 198/369.2, 367.1; 209/562, 573
See application file for complete search history.

(56) References Cited

U.S. PATENT DOCUMENTS

| | | | | |
|---|---|---|---|---|
| 3,982,619 A | * | 9/1976 | Sieverin et al. | 193/31 R |
| 4,838,406 A | * | 6/1989 | Levasseur | 193/31 A |
| 5,518,102 A | * | 5/1996 | Hershline | 198/367 |
| 5,797,476 A | * | 8/1998 | Jones et al. | 194/346 |
| 5,871,078 A | * | 2/1999 | Arnarson et al. | 198/367 |
| 6,263,883 B1 | * | 7/2001 | Furmanski et al. | 198/367 |

FOREIGN PATENT DOCUMENTS

DE 44 15 788 A1 9/1995

OTHER PUBLICATIONS

Patent Abstract of Japan, Publication No. 2000271793, published Mar. 10, 2000, for Application No. 11083021, Applicant Sumitomo Heavy Ind Ltd.

* cited by examiner

*Primary Examiner*—James R Bidwell
(74) *Attorney, Agent, or Firm*—Vidas, Arrett & Steinkraus, P.A.

(57) ABSTRACT

Apparatus for the outflow of pressed items from a rotary press, with a first channel section connecting directly to the rotary press, to which at least two channel sections are connected, to which a deflector is attached, which is swivel mounted at an axis almost vertical to the longitudinal extension of the first and/or second channel section and optionally connects the first channel section with one of the other channel sections and a pivot drive for the deflector below or above the channel sections, characterized in that a bearing pin for the deflector is connected in a torque-proof manner with a channel section and the swivel drive is coupled with the deflector via a magnetic coupling eccentric to the bearing pin.

5 Claims, 1 Drawing Sheet

APPARATUS FOR THE OUTFLOW OF PRESSED ITEMS FROM A ROTARY PRESS

CROSS-REFERENCE TO RELATED APPLICATIONS

Not applicable.

STATEMENT REGARDING FEDERALLY SPONSORED RESEARCH

Not applicable.

BACKGROUND OF THE INVENTION

Tablets or other pressed items for example are produced in a rotary press. After the pressed items are stripped off the top side of a mold plate, they are conveyed to an outflow. A receptacle for receiving the pressed items is arranged behind or below the outflow. It is known to provide two more parallel channel or groove sections, into which the pressed items run, in order to be collected in a container. The direction is selected with the help of a deflector, which is driven by a drive motor. The drive motor is in turn driven depending on certain press states of the rotary press from the control computer of the rotary press. The deflector is connected in a force-fit manner with the drive below the outflow via a shaft, wherein the shaft goes through an opening in the outflow channel.

The object of the invention is to create an apparatus for the outflow of pressed items from a rotary press, which provides for complete separation of deflector and drive in addition to simply assembly and disassembly.

BRIEF SUMMARY OF THE INVENTION

In the case of the apparatus according to the invention, the deflector is swivel mounted by means of a pivot pin, which is connected in a torque-proof manner with a channel section. The swivel drive below or above one of the channel sections is coupled with the deflector via a magnetic coupling eccentric to the pivot pin.

In the case of the apparatus according to the invention, an opening through a channel floor or a channel ceiling is omitted so that full decoupling is achieved between the product area and the drive. This allows the outflow to be cleaned better. The disassembly is also made easier with the apparatus according to the invention.

In accordance with one embodiment of the invention, the swivel drive is a rotary drive, the rotational axis of which coincides with the swivel axis of the deflector. An arm or a segment, which holds at least one magnet or at least one magnetically functioning material piece, is attached to a drive shaft of the rotary drive, and at least one magnet or at least one magnetically functioning material piece is attached to a deflector, preferably at the same distance from the swivel axis as the magnet on the arm or segment of the swivel drive. If the drive motor is rotated at a certain angle, the deflector follows via the magnetic coupling. It does not matter that the drive motor does not need to achieve a precise angle of rotation, since the end positions of the deflector can be specified by a corresponding stop or a wall of the concerned channel section. However, it is advantageous if, in both end positions that the deflector can assume, the magnetic or magnetically functioning material pieces is approximately aligned in order to ensure good magnetic coupling. The floor or the ceiling of the concerned channel section is preferably not magnetic in order to not impair the efficacy of the magnetic coupling.

The at least one magnet attached to the deflector or the at least one magnetically functioning piece is preferably embedded in the side of the deflector, which is attached to the floor or the ceiling or the magnet on the bottom side or top side of the channel section. The route to be bridged by the lines of magnetic flux is thus mainly restricted by the thickness of the floor or the ceiling of the concerned channel section.

BRIEF DESCRIPTION OF THE SEVERAL VIEWS OF THE DRAWINGS

The invention is explained in greater detail using drawings.

DETAILED DESCRIPTION OF THE INVENTION

Figure 1:
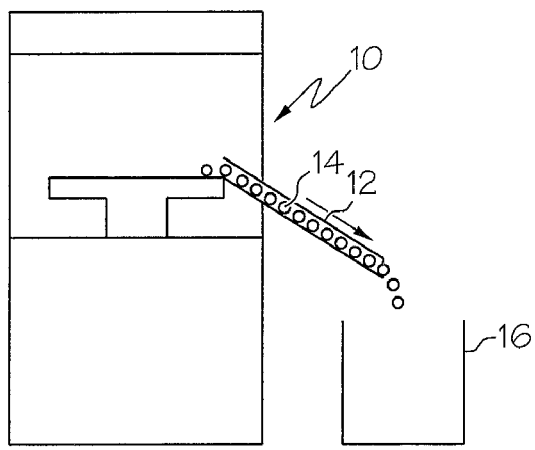
FIG. 1 shows schematically the tablet outflow for a rotary press.
Figure 2:
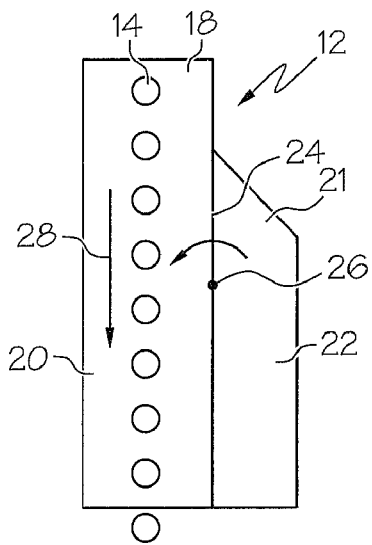
FIG. 2 shows two parallel channel sections with a deflector in a first position.
Figure 3:
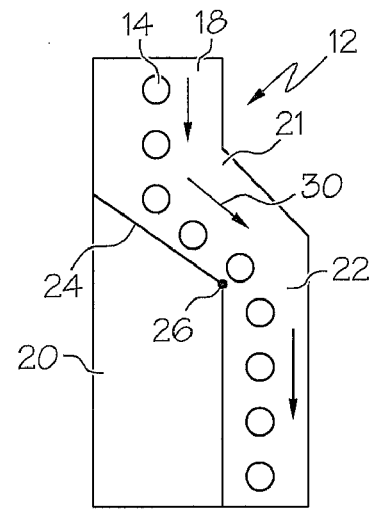
FIG. 3 shows the representation according to FIG. 2 with the deflector in a second position.

While this invention may be embodied in many different forms, there are described in detail herein a specific preferred embodiment of the invention. This description is an exemplification of the principles of the invention and is not intended to limit the invention to the particular embodiment illustrated FIG. 1 shows a fully schematic view of a rotary press 10, in which e.g. tablets are produced. Number 12 shows a channel arrangement, over which tablets 14 slide one after the other into a container 16 below the channel arrangement 12. The channel arrangement is also shown schematically in FIGS. 1 and 2. It has a first channel section 18, which connects directly to the stripper device in the rotary press 10 (not shown). A second channel section 20 connects linearly to the first channel section 18. A third channel section 22 runs parallel to the second channel section 20 and is connected with the first channel section 18 via an angled transition section 21. A deflector 24, which can be pivoted around a pivot point 26, is arranged between the second and third channel section 20, 22. In the position of deflector 24 shown in FIG. 2, the tablets 14 slide from the first into the second channel section. This is indicated by arrow 28. In FIG. 3, the deflector 24 is in the second end position, in which the second channel section 20 is locked, and the tablets 14 are diverted by the deflector 24 into the third channel section 22, as shown by arrow 30.

Figure 4:
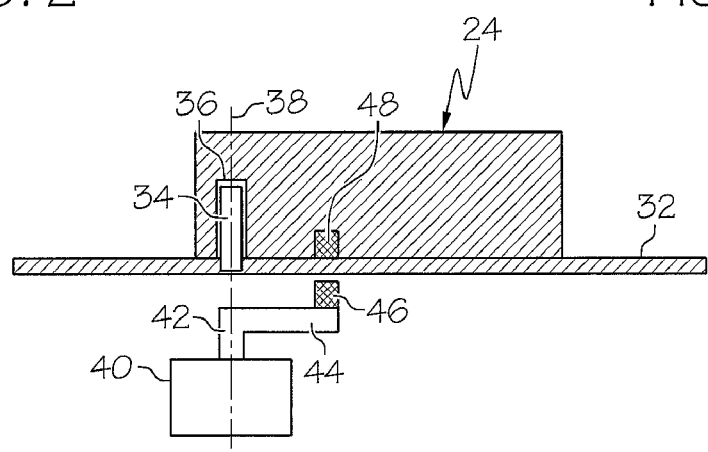
FIG. 4 shows schematically a deflector and a drive for it according to the invention.

The drive for the deflector 24 is shown schematically in FIG. 4. A pivot pin 34 is attached in a torque-proof manner on the floor of the channel arrangement 32, which extends below the deflector 24. It extends into a bearing recess 36 of the deflector body so that the deflector 24 is swivel mounted on axis 38. A roller bearing is provided for mounting. Moreover, the mounting can be executed such that a small gap is created between the bottom side of the deflector body and the top side of the floor 32 and thus only a small amount of force needs to be applied to pivot the deflector 24.

A rotary drive 40 is arranged below the bottom 32, with a drive shaft 42. The axis of the drive shaft 42 coincides with the pivot axis 38. An arm 44, which extends from the drive shaft 42 at a right angle, is attached to the end of the drive shaft 42. Therefore, the arm 44 progresses parallel to and at a distance from the floor 32. A permanent magnet 46 is attached to the arm 44. Another permanent magnet 48 is embedded in the bottom side of the deflector body, whereby it does not extend beyond the bottom side of the deflector body 24. The distance of the permanent magnet 48 from the pivot axis 38 coincides with the distance of the permanent magnet 46 from the same axis. Therefore, if the swivel drive is activated, the arm 44 pivots the permanent magnet 46 and thereby picks up the other permanent magnet 48 and thus also the deflector 24.

It is understood that only one of the two pieces 46, 48 must have permanent magnetic properties, while the other piece can be ferromagnetic. It is also understood that e.g. the permanent magnet 46 can be replaced by an electromagnet.

The rotary drive 40 is controlled by a process computer for the rotary press 20 (not shown). It is not required that an exact angle of rotation is hereby specified for the rotary drive 40, since the pivot limit is specified by the corresponding walls of the channel sections.

The above disclosure is intended to be illustrative and not exhaustive. This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below.

This completes the description of the preferred and alternate embodiments of the invention. Those skilled in the art may recognize other equivalents to the specific embodiment described herein which equivalents are intended to be encompassed by the claims attached hereto.

What is claimed is:

1. Apparatus for the outflow of pressed items from a rotary press, with a first channel section connecting directly to the rotary press, to which at least two channel sections are connected, to which a deflector is attached, which is swivel mounted at an axis almost vertical to the longitudinal extension of the first and/or second channel section and optionally connects the first channel section with one of the other channel sections and a swivel drive for the deflector below or above the channel sections, characterized in that a bearing pin for the deflector is connected in a torque-proof manner with a channel section and the swivel drive is coupled with the deflector via a magnetic coupling eccentric to the bearing pin.

2. Apparatus according to claim 1, characterized in that the swivel drive is a rotary drive, the axis of rotation of which coincides with the swivel axis of the deflector, an arm or a segment is attached to a drive shaft of the rotary drive, which holds at least one permanent magnet or at least one magnetically functioning material piece and at least one permanent magnet or at least one magnetically functioning material piece is attached to the deflector, approximately at the same distance from the swivel axis as the permanent magnet or the magnetically functioning material piece on the arm.

3. Apparatus according to claim 1, characterized in that a permanent magnet is provided for both the deflector and the swivel drive.

4. Apparatus according to claim 2, characterized in that the magnet attached to the arm or the segment of the swivel drive is an electromagnet.

5. Apparatus according to claim 2, characterized in that the permanent magnetic or magnetically functioning material piece are embedded in the side of the deflector, which is turned towards the floor or the ceiling of the attached channel section.

* * * * *